(12) United States Patent
Sigoure

(10) Patent No.: US 11,070,429 B2
(45) Date of Patent: *Jul. 20, 2021

(54) TRACKING STATE OF COMPONENTS WITHIN A NETWORK ELEMENT

(71) Applicant: Arista Networks, Inc., Santa Clara, CA (US)

(72) Inventor: Benoit Sigoure, San Francisco, CA (US)

(73) Assignee: Arista Networks, Inc., Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/825,619

(22) Filed: Mar. 20, 2020

(65) Prior Publication Data

US 2020/0220779 A1    Jul. 9, 2020

Related U.S. Application Data

(63) Continuation of application No. 15/165,329, filed on May 26, 2016, now Pat. No. 10,601,661.

(60) Provisional application No. 62/263,487, filed on Dec. 4, 2015, provisional application No. 62/182,942, filed on Jun. 22, 2015.

(51) Int. Cl.
*G06F 15/16* (2006.01)
*H04L 12/24* (2006.01)
*H04L 29/08* (2006.01)

(52) U.S. Cl.
CPC ........ *H04L 41/0856* (2013.01); *H04L 41/046* (2013.01); *H04L 41/085* (2013.01); *H04L 41/0853* (2013.01); *H04L 41/0863* (2013.01); *H04L 41/147* (2013.01); *H04L 67/1097* (2013.01)

(58) Field of Classification Search
CPC ... H04L 41/0631; H04L 41/12; H04L 41/142; H04L 43/067; H04L 41/0856; H04L 41/046
USPC .......................................... 709/202
See application file for complete search history.

(56) References Cited

U.S. PATENT DOCUMENTS

| | | | |
|---|---|---|---|
| 5,534,845 A * | 7/1996 | Issa | B60R 25/1004 340/425.5 |
| 6,192,418 B1 * | 2/2001 | Hale | G06F 9/547 719/312 |
| 6,507,589 B1 * | 1/2003 | Ramasubramani | H04L 67/2814 370/465 |

(Continued)

*Primary Examiner* — Anthony Mejia
(74) *Attorney, Agent, or Firm* — Fountainhead Law Group P.C.

(57) ABSTRACT

Various embodiments are described herein to track the state of components within a network element. One embodiment provides for a network element comprising a control plane including logic to transmit configuration and status of the network element during network element operation, the configuration including a configured state of one or more agents of the control plane and the status including operational status of one or more agents of the control plane; and a data plane to forward network data from an ingress interface to an egress interface, each of the ingress interface and egress interface including one or more counters, wherein the status of the continuously transmitted status of the network element additionally includes the one or more counters of each of the ingress interface and egress interface.

20 Claims, 11 Drawing Sheets

(56) References Cited

U.S. PATENT DOCUMENTS

| | | | |
|---|---|---|---|
| 6,674,767 B1* | 1/2004 | Kadyk | H04L 12/66 370/466 |
| 6,686,838 B1* | 2/2004 | Rezvani | G06F 3/04842 340/506 |
| 6,756,998 B1* | 6/2004 | Bilger | H04L 12/2803 715/734 |
| 6,963,981 B1* | 11/2005 | Bailey | G06F 8/60 726/22 |
| 7,043,537 B1* | 5/2006 | Pratt | H04L 67/34 709/220 |
| 7,107,322 B1* | 9/2006 | Freeny, Jr. | G06Q 30/06 709/204 |
| 7,149,814 B2* | 12/2006 | Neufeld | H04L 67/34 709/248 |
| 7,164,907 B2* | 1/2007 | Cochran | G06F 9/4411 455/418 |
| 7,412,447 B2* | 8/2008 | Hilbert | H04L 51/22 |
| 7,529,192 B2 | 5/2009 | Labovitz et al. | |
| 7,681,201 B2* | 3/2010 | Dale | G06F 9/545 719/313 |
| 7,684,418 B2* | 3/2010 | Scott | H04L 29/06 370/401 |
| 7,843,906 B1 | 11/2010 | Chidambaram | |
| 7,843,907 B1 | 11/2010 | Abou-Emara | |
| 7,928,840 B2* | 4/2011 | Kim | G08B 21/0277 340/531 |
| 7,970,863 B1* | 6/2011 | Fontaine | H04L 41/00 709/218 |
| 8,347,384 B1 | 1/2013 | Preston | |
| 8,584,199 B1* | 11/2013 | Chen | H04L 45/308 726/1 |
| 8,667,399 B1* | 3/2014 | Brandwine | G06F 9/5072 715/738 |
| 8,667,495 B1* | 3/2014 | Brandwine | H04L 41/0806 718/104 |
| 8,954,978 B1* | 2/2015 | Brandwine | H04L 47/783 718/104 |
| 8,966,027 B1 | 2/2015 | Brandwine et al. | |
| 9,009,349 B2 | 4/2015 | Narayanan | |
| 9,495,234 B1 | 11/2016 | Hamman et al. | |
| 9,509,772 B1 | 11/2016 | Rose et al. | |
| 9,838,272 B2 | 12/2017 | Djukic et al. | |
| 10,057,156 B2* | 8/2018 | Larson | H04L 45/02 |
| 10,187,286 B2 | 1/2019 | Sigoure | |
| 10,291,497 B2* | 5/2019 | Mehta | H04L 12/4641 |
| 10,559,193 B2* | 2/2020 | Naidoo | G08B 25/008 |
| 10,601,661 B2 | 3/2020 | Sigoure | |
| 10,623,258 B2 | 4/2020 | Sigoure | |
| 2002/0091991 A1 | 7/2002 | Castro | |
| 2002/0101820 A1 | 8/2002 | Gupta et al. | |
| 2002/0150086 A1* | 10/2002 | Bailey | H04L 29/1216 370/352 |
| 2003/0023839 A1* | 1/2003 | Burkhardt | G06F 9/4416 713/1 |
| 2003/0062997 A1* | 4/2003 | Naidoo | G08B 13/19691 340/531 |
| 2003/0137991 A1* | 7/2003 | Doshi | H04L 65/1043 370/466 |
| 2005/0021626 A1* | 1/2005 | Prajapat | H04L 67/02 709/205 |
| 2005/0120082 A1* | 6/2005 | Hesselink | H04L 63/0272 709/203 |
| 2005/0232284 A1* | 10/2005 | Karaoguz | H04W 4/18 370/401 |
| 2005/0267605 A1* | 12/2005 | Lee | G08B 25/009 700/19 |
| 2005/0267963 A1* | 12/2005 | Baba | G06F 3/0605 709/223 |
| 2005/0282557 A1* | 12/2005 | Mikko | H04W 64/00 455/456.1 |
| 2006/0190777 A1 | 8/2006 | Chuang | |
| 2006/0242395 A1* | 10/2006 | Fausak | G06F 9/4416 713/1 |
| 2006/0271695 A1* | 11/2006 | Lavian | H04L 63/20 709/229 |
| 2006/0282886 A1* | 12/2006 | Gaug | H04L 63/1408 726/5 |
| 2007/0079385 A1* | 4/2007 | Williams | G06F 21/608 726/27 |
| 2007/0208551 A1 | 9/2007 | Herro | |
| 2007/0211742 A1 | 9/2007 | Trisno et al. | |
| 2007/0216764 A1* | 9/2007 | Kwak | G07C 9/00309 348/14.06 |
| 2007/0256105 A1* | 11/2007 | Tabe | G08B 25/085 725/78 |
| 2008/0046593 A1* | 2/2008 | Ando | H04L 61/15 709/245 |
| 2008/0080536 A1 | 4/2008 | Chhaya et al. | |
| 2008/0117922 A1* | 5/2008 | Cockrell | H04L 65/1023 370/401 |
| 2009/0077622 A1* | 3/2009 | Baum | H04L 12/2818 726/1 |
| 2009/0307307 A1* | 12/2009 | Igarashi | H04N 21/43615 709/203 |
| 2010/0118714 A1* | 5/2010 | Labovitz | H04L 41/142 370/252 |
| 2010/0226260 A1 | 9/2010 | Zinjuvadia et al. | |
| 2010/0241748 A1* | 9/2010 | Ansari | G06F 16/64 709/225 |
| 2011/0283006 A1* | 11/2011 | Ramamurthy | H04L 41/00 709/228 |
| 2011/0305160 A1 | 12/2011 | Green et al. | |
| 2012/0320788 A1* | 12/2012 | Venkataramanan | H04L 47/2458 370/253 |
| 2013/0010610 A1 | 1/2013 | Karthikeyan et al. | |
| 2013/0122894 A1 | 5/2013 | Carlin et al. | |
| 2013/0332399 A1 | 12/2013 | Reddy et al. | |
| 2013/0342342 A1 | 12/2013 | Sabre et al. | |
| 2014/0229630 A1* | 8/2014 | Narayanan | H04L 45/38 709/238 |
| 2014/0314400 A1 | 10/2014 | Lee | |
| 2014/0337467 A1 | 11/2014 | Pech et al. | |
| 2015/0092561 A1 | 4/2015 | Sigoure | |
| 2015/0127971 A1 | 5/2015 | Arroyo et al. | |
| 2015/0195192 A1 | 7/2015 | Vasseur et al. | |
| 2015/0281015 A1 | 10/2015 | Griffith et al. | |
| 2015/0317519 A1 | 11/2015 | Blair | |
| 2016/0020800 A1 | 1/2016 | Krishnamoorthy et al. | |
| 2016/0021173 A1 | 1/2016 | Tapia | |
| 2016/0036636 A1 | 2/2016 | Erickson et al. | |
| 2016/0301558 A1 | 10/2016 | Twiss | |
| 2016/0301579 A1 | 10/2016 | Djukic et al. | |
| 2016/0373302 A1 | 12/2016 | Sigoure | |
| 2017/0048126 A1* | 2/2017 | Handige Shankar | H04L 41/0622 |
| 2017/0070387 A1 | 3/2017 | Rao et al. | |
| 2017/0085488 A1 | 3/2017 | Bhattacharya et al. | |
| 2017/0109260 A1 | 4/2017 | Wang et al. | |
| 2018/0242387 A1* | 8/2018 | El Khayat | H04W 76/12 |
| 2020/0244556 A1 | 7/2020 | Shevade et al. | |

* cited by examiner

TRACKING STATE OF COMPONENTS WITHIN A NETWORK ELEMENT

RELATED APPLICATIONS

The present application is a continuation of U.S. application Ser. No. 15/165,329 filed May 26, 2016, which claims the benefit of priority of U.S. Provisional Application No. 62/182,942, filed Jun. 22, 2015, and also claims the benefit of U.S. Provisional Application No. 62/263,487, filed Dec. 4, 2015, the entireties of which are incorporated by reference.

FIELD OF INVENTION

This invention relates generally to datacenter networking and more particularly to software for tracking state of components within a network element.

BACKGROUND OF THE INVENTION

Traditional enterprise datacenter networks may be susceptible to software crashes and unplanned outages. Multiple, different software releases across switch platforms can make deploying new features and services a lengthy and time-consuming process. Additionally, the manual configuration used within certain datacenter networks may result in configuration errors, which may compromise network uptime or availability.

Existing network operating systems may operate based on customized operating system kernels having state information distributed throughout the system or perhaps embedded within the kernel. In such systems, the software state may be maintained using synchronous or asynchronous polling that checks state every few milliseconds or seconds on every interface and internal data structure. The polling mechanism may result in wasted cycles, as well as possible deadlocks and/or race conditions during the occurrence of multiple concurrent events. In some existing systems, changes in state may be handled by custom crafted code-paths that enable software processes to react in a tightly ordered sequence depending on the underlying event, which may result in reliability issues due to the difficulties in testing all possible code-paths, which can result in long development and extended customer test and qualification cycles.

SUMMARY OF THE DESCRIPTION

Various embodiments are described herein to track the state of components within a network element. One embodiment provides for a network element comprising a control plane including logic to transmit configuration and status of the network element during network element operation, the configuration including a configured state of one or more agents of the control plane and the status including operational status of one or more agents of the control plane; and a data plane to forward network data from an ingress interface to an egress interface, each of the ingress interface and egress interface including one or more counters, wherein the status of the network element additionally includes the one or more counters of each of the ingress interface and egress interface.

One embodiment provides for a networked system comprising multiple network elements, each network element configured to continuously transmit runtime configuration and status data over a network, the configuration including a configured state of one or more agents of a control plane of the network element and the status including operational status of one or more agents of the control plane of the network element; a collector node to receive the configuration or status data of each of the multiple network elements and store the data in a first distributed database; and a subscriber node to subscribe to one or more of the multiple network elements, the subscriber node to receive the configuration and status of the one or more of the multiple network elements via the first distributed database, reconstruct the configuration and status of the one or more of the multiple network elements at a specific point in time and transmit a configuration message to the one of more of the multiple network elements, the configuration message to cause the one or more of the multiple network elements to adopt the configuration or status of the specific point in time.

One embodiment provides for a non-transitory machine readable medium storing instructions which, when executed by one or more processors of a control plane of a network element, cause the one or more processors to perform operations including detecting a change in one or more of operational status and configuration state of the network element; storing the change in a coalescing queue; transmitting a change in the coalescing queue via a network interface of the network element to a collector node; and removing the change from the coalescing queue. In one embodiment, the operations additionally include storing the change in a coalescing map, transmitting a change from one of the coalescing queue and the coalescing map, and updating an existing entry in the coalescing map upon receiving an additional change in operational state when the existing entry is related additional change.

For the various embodiments described, a network element includes any one or more of a router, switch, hub, bridge, gateway, or other infrastructure devices for a packet-forwarding network. Furthermore, a network element can be a physical or virtual device. Additionally, the network data includes various types of packet forwarding network data including packets, datagrams, frames, or other data types used within a packet-switched network.

Other methods and apparatuses are also described.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
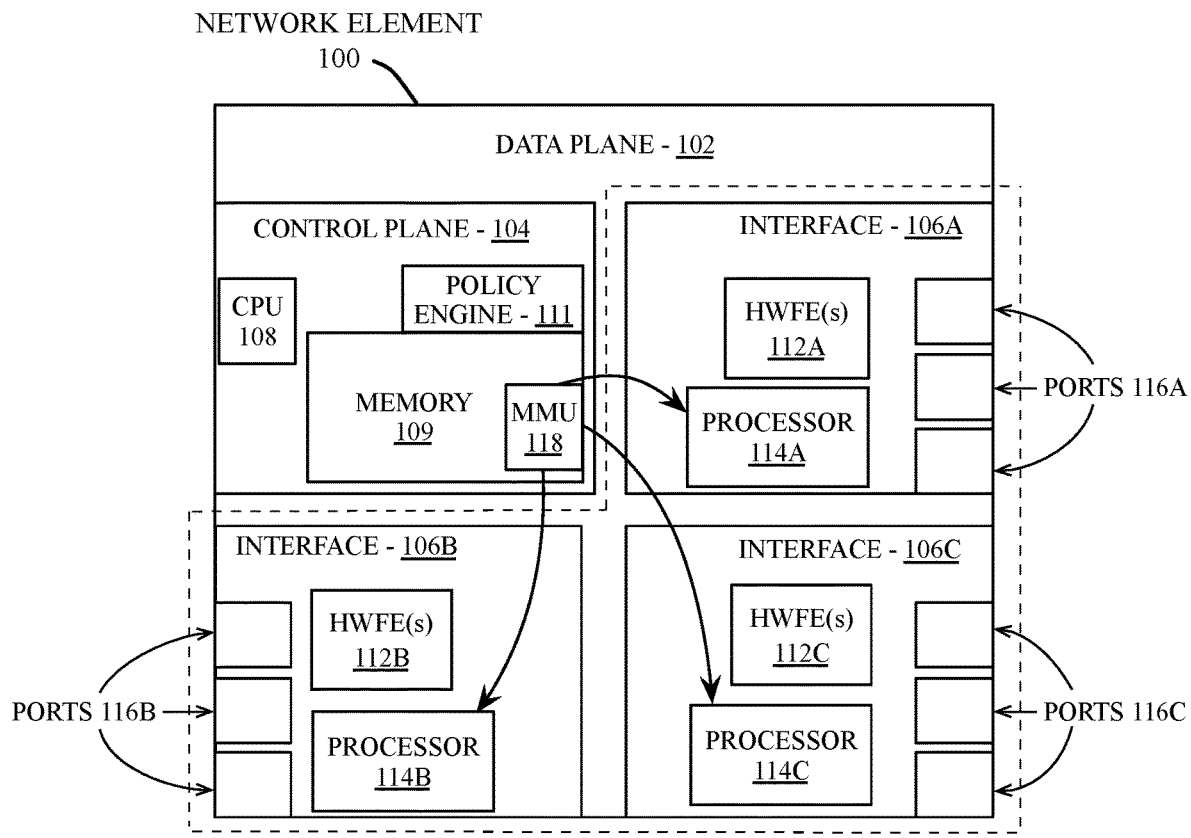
FIG. 1 is a block diagram of one embodiment of a network element including a data plane coupled to a control plane and several interface devices.

Existing network operating system may not have the ability to expose internal state of the network elements and applications executing on the network elements. Accordingly, the only programmability that is readily provided in traditional enterprise stacks is via high-level API wrappers, which may provide the same information as simple network management protocol (SNMP) or the command line interface (CLI).

Embodiment described herein provide a network element (e.g., switch, router, etc.) having extensible operating system including a state monitoring agent that can be configured to report all configuration state and status changes on the network element. In one embodiment, all or substantially all changes to the network element, including network interface counters, are reported in substantially real time to a collector node, or an interface node of the collector node. As opposed to polling systems such as SNMP that can be used to poll or retrieve data from a network element, the state monitoring agent enabled by embodiments described herein actively pushes all configuration state and status changes that occur on a network element. In one embodiment, an external collector node connects to the network element and subscribes to part or all of the state of the network element. Upon receiving a subscription request, the network element pushes the current state corresponding to the request and subsequently pushes all subsequent changes made to the subscribed state.

In one embodiment, a state monitoring agent can provide sufficient information to reconstruct the configuration state and status of a specific network element at an arbitrary time in the past. In one embodiment, this information can be pushed back to the network element to restore the network element to a specific historical state. Information for each network element in a datacenter environment can be captured and stored. In one embodiment, the system can be scaled to monitor and control all network elements associated with an enterprise network, regardless of geographic location.

In embodiments described herein, configuration state of a network element includes aspects such as the pre-configured settings of a network element, configured data rate of configurable network interfaces (e.g., 1 Gb/s, 10 Gb/s, 40, Gb/s, 100, Gb/s, etc.), the advertised capabilities of network interfaces (e.g., auto-negotiate, duplex, flow-control, etc.), configured interface status (e.g., up, down), and any other configurable settings of the network element. In one embodiment, operational status of the network element includes information discovered at runtime, such as runtime interface link status, network processor status, cooling fan status, and software agent status, including debug information. The operational status can additionally include forwarding tables (e.g., ARP tables, routing tables, MAC address tables), and other network tables stored in memory of the network element, as well as system or agent log changes. The configuration state and operational status changes can be transmitted in real time or quasi-real time using data coalescing. The configuration state and operational status updates can be transmitted as in-band transmissions over the production network or as out-of-band transmissions of a dedicated management link. In one embodiment, the updates are transmitted to one or more collector nodes that aggregate the data from multiple network elements. A group of network elements can be configured with a direct link to a collector node or the update information can be forwarded across the network to one or more data-center collectors. In one embodiment, where updates are forwarded across the network the transmission rate of updates can dynamically adjusted to not interfere with other network data (e.g., via QoS policy or traffic class settings).

Embodiments of the invention may be implemented on parallel processing systems that implements centralized management or implements distributed management. For example, certain aspects of some embodiments may be implemented using an Apache Hadoop system. However, those skilled in the art will appreciate that the invention is not limited to Hadoop. Rather, embodiments of the invention may be implemented with other parallel processing systems without departing from the invention. For example, embodiments of the invention may be implemented on any distributed storage system (e.g., Ceph), any distributed compute system (e.g., YARN, Gearman, Sidekiq, etc.) and/or any distributed database system (e.g., HBase, Cassandra, etc.). In one embodiment, the aggregated state for connected network elements is stored in a large scale, distributed database, such as the HBase, or another suitable database.

The databases can be replicated and geographically located near a concentration of network elements. For example, each connected datacenter can have a separate network element configuration state and status database, and the contents of the database of each datacenter can be replicated to each other database, such that each connected datacenter can access configuration state and status for each network element in each other datacenter.

To provide a thorough explanation of the various embodiments, numerous specific details are set forth herein. However, one having ordinary skill in the art will understand that embodiments may be practiced without these specific details. In some instances well-known components, structures, and techniques are not shown in detail to avoid obscuring key details within this description. Reference herein to "one embodiment" or "an embodiment" indicate that a particular feature, structure, or characteristic described in connection or association with the embodiment can be included in at least one of such embodiments. However, the appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Network Elements and Network System

The processes depicted in the figures that follow, are performed by processing logic that comprises hardware (e.g., circuitry, dedicated logic, etc.), software (such as is run on a general-purpose computer system or a dedicated or specialized machine), or a combination of both. Although some of the processes are described below in terms of sequential operations, it should be appreciated that some of the operations described may be performed in a different order. Moreover, some operations may be performed in parallel rather than sequentially.

FIG. 1 is a block diagram of one embodiment of a network element 100 that includes a data plane 102 coupled to a control plane 104 and several interface devices 106A-C. In some network elements, the data plane 102 is referred to as the forwarding plane. In one embodiment, the control plane 104 includes central processing unit (CPU) 108 and memory 109 to store data. The CPU 108 can be used to process information for the control plane 104 and write configuration data for hardware forwarding engines 112A-C in the network interface devices 106A-C. Additionally, the CPU can read data from the hardware forwarding engines 112A-C. Where the network element 100 is a virtual network element, software forwarding engines are used in place of the hardware forwarding engines 112A-C. In one embodiment, the data plane 102 receives, processes, and forwards network data using various configuration data (e.g., forwarding, security, quality of service (QoS), and other network traffic processing information). The data plane 102 includes multiple network interface devices 106A-C (e.g., switches, routers, etc.) that can each receive and/or forward network traffic, where the network traffic is processed by the hardware forwarding engines 112A-C (or software forwarding engines) after receipt and/or before being forwarded to a next hop. Each of the interface devices 106A-C includes multiple ports 116A-C that are used to receive and transmit network data.

In one embodiment, for each received unit of network data, the data plane 102 determines a destination address for the network data, looks up the requisite information for that destination in one or more tables stored in the data plane, and forwards the data out the proper outgoing interface, for example, one of the interface devices 106A-C. In one embodiment, each of the interface devices 106A-C includes one or more hardware forwarding engines (HWFE(s)) 112A-C, processor 114A-C, and ports 116A-C, respectively. Each of the hardware forwarding engines 112A-C forwards data for the network element 100 by performing routing, switching, or other types of network forwarding. Each processor 114A-C can be used to accelerate various functions of the interface devices 106A-C. For example and in one embodiment, the processors 114A-C can program the hardware forwarding engines 112A-C. The processors 114A-C can also push data from the hardware forwarding engines 112A-C to a CPU 108 in the control plane 104.

In one embodiment, the control plane 104 gathers the configuration data for the hardware forwarding engines 112A-C from different sources (e.g., locally stored configuration data, via a command line interface, or other management channel (e.g., SNMP (Simple Network Management Protocol), Simple Object Access Protocol (SOAP), Representational State Transfer type Application Programming Interface (RESTful API), Hypertext Transfer Protocol (HTTP), HTTP over Secure Sockets layer (HTTPs), Network Configuration Protocol (NETCONF), Secure Shell (SSH), and/or another management protocol) and pushes this configuration data to the hardware forwarding engines 112A-C.

In one embodiment, the memory 109 that is used to store data for the control plane 104 is shared with the data plane 102. In such embodiment a memory management unit (MMU) 118 coupled to the memory 109 to allow processors 114A-C direct access to the memory 109. In one embodiment, the MMU 118 allows the processors 114A to directly access memory 109 without requiring the CPU 108 in the control plane 104 to send data to each processor 114A-C. In one embodiment, the control plane 104 includes a policy engine 111 to define a QoS policy to be implemented by the hardware forwarding engines 112A-C on network traffic flowing through the network element 100. For example and in one embodiment the policy engine 111 can configure a QoS policy to minimize the latency of some type of network traffic, or to apply traffic shaping policies on the overall flow of traffic through the network element, or within a larger network topology. In one embodiment, logic to perform the timing of network data flow is consolidated into the hardware of the data plane 102 of each network element 100.

The network element 100 can be incorporated into a network as any one or more of a switch, router, hub, bridge, gateway, etc., or any type of device that can provide access to a network (e.g., physical network, virtualized network, etc.). In various embodiments, different types of protocols can be used to communicate network (e.g., Ethernet, wireless, Synchronous Optical Networking (SONET), Fiber channel, Infiniband, etc.). The network data being communicated by the network element 102 can be a stream of network frames, datagrams or data packets, or other types of discretely switched network data. In one embodiment, the network element 100 communicates network data between various networked devices using a variety of communicating techniques (e.g., layer 2 switching, layer 3 routing, traffic shaping, applying a quality of service (QoS) policy, etc.).

Figure 2:
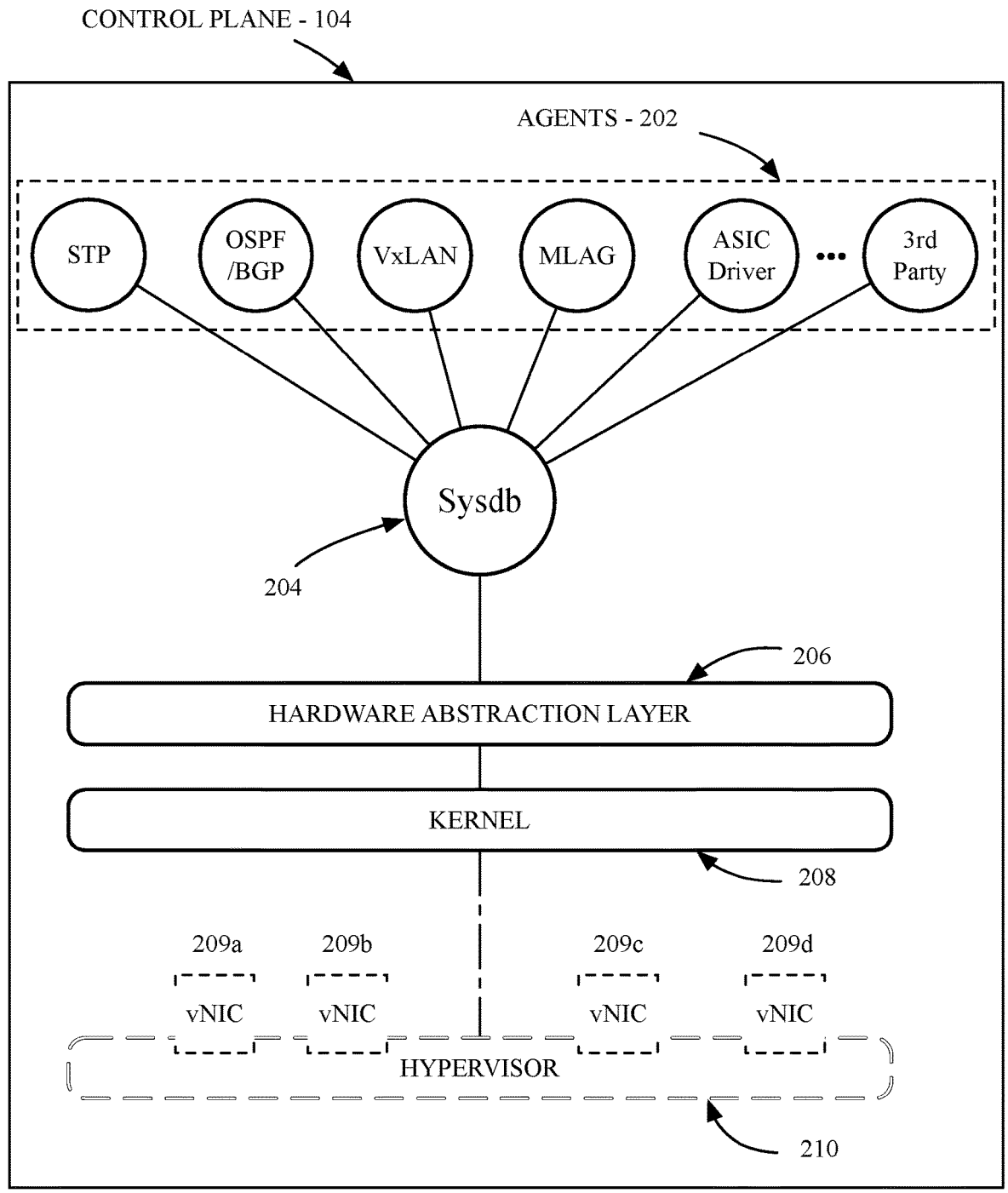
FIG. 2 is a block diagram of a network element software system 200, according to an embodiment.

FIG. 2 is a block diagram of a network element software system 200, according to an embodiment. In one embodiment, the network element software system 200 resides in the control plane (e.g., control plane 104) of a network element 100 as in FIG. 1. The network element software system 200 includes multiple software agents 202 including, but not limited to agents to perform operations to implement Spanning Tree Protocol (STP), Open Shortest Path First (OSPF)/Border Gateway Protocol (BGP), Virtual eXtensible LAN (VxLAN), and Multi-Chassis Link Aggregation (MLAG). The agents can additionally include one or more forwarding ASIC drivers as well as third-party agents. In one embodiment, the agents each communicate with a central system database (e.g., Sysdb 204). In one embodiment, the software system 200 additionally includes a hardware abstraction layer 206 to abstract hardware specific details to enable the network element software system 200 to operate on a variety of different hardware associated with different models and implementations of network elements. A kernel 208 provides core operating system functionality such as scheduling and base level system resource management. In one embodiment, the network element software system 200 can be operated within a virtual machine, and can provide virtual network interface cards (vNIC 309a-d) via a hypervisor 210.

In one embodiment, each of the multiple agents 202 interfaces with the Sysdb 204 to record configuration state and operational status. In such embodiment, agents in the system mount can mount the Sysdb 204 to send and receive configuration and status. Read and write permissions can be specified for each mount. In one embodiment, Sysdb utilizes an event-driven publish/subscribe model. If the configuration state of an agent changes, Sysdb can send an event notification to that agent, which will then update its local copy. Similarly when the agent writes to the Sysdb mount, the agent changes its local copy and the write returns immediately. This change notification can be buffered and asynchronously sent to Sysdb, which then notifies all other agents who have subscribed to the changed agent. In one embodiment Sysdb information is maintained in RAM, along with other status and state information, and once the network element is turned off or restarted, such information is lost. In other embodiments, network elements include a sufficient amount of sufficiently high performance local storage to store Sysdb information in non-volatile memory.

In embodiments described herein, network element configuration status and operational state agent transmits Sysdb information, as well as forwarding configuration data, to one or more centralized collector nodes that archive status and status information for multiple network elements on a network. The collected information can include all data in shared memory of the network element, including but not limited to interface tables, ARP tables and routing tables, system logs (e.g., syslog, agent logs), and hardware specific state, such as interface counters, service counters, etc. In one embodiment, data visible to the kernel 208 and/or hardware abstraction layer 206 can also be collected.

Figure 3:
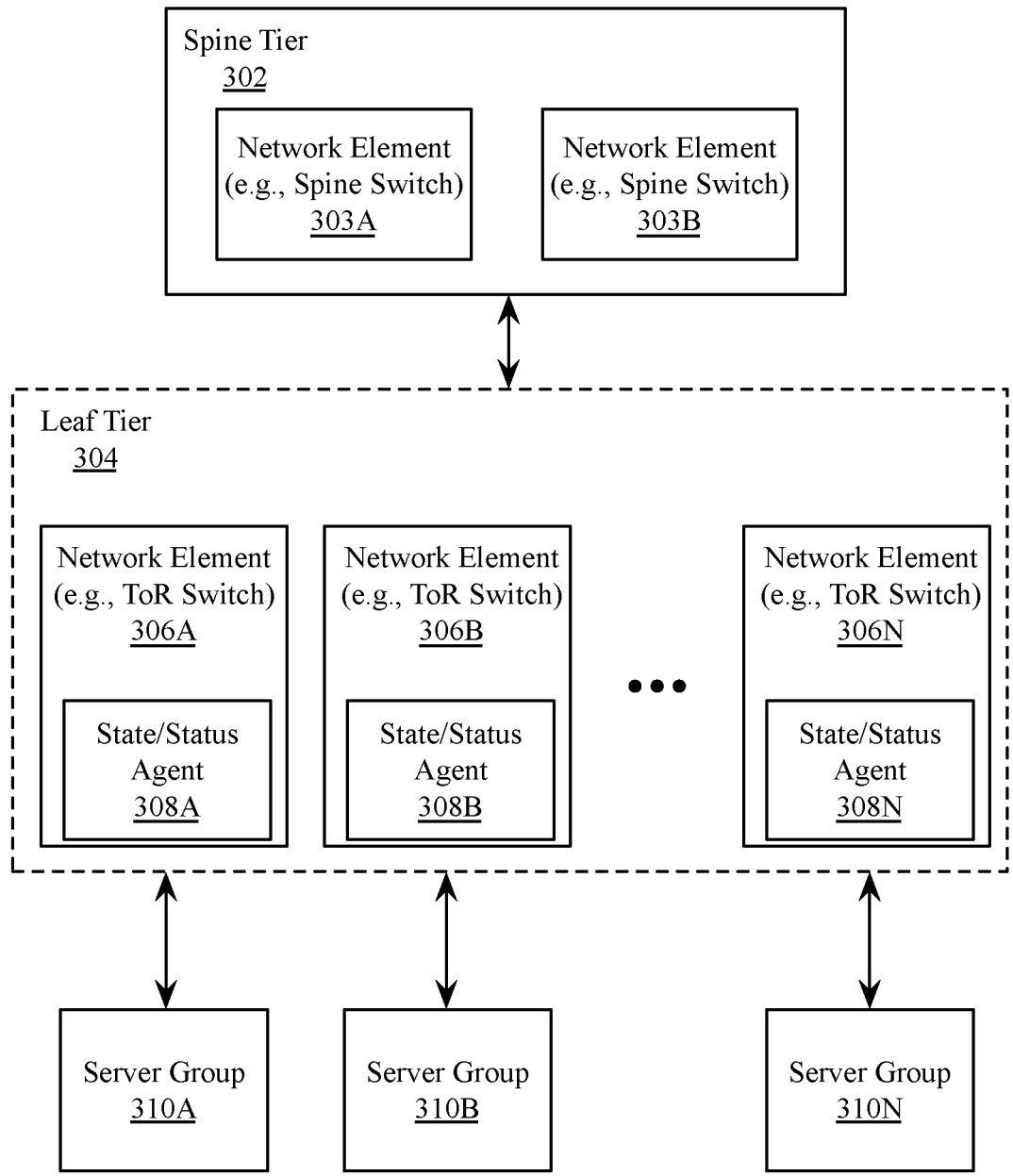
FIG. 3 is a block diagram of a network system, according to an embodiment.

FIG. 3 is a block diagram of a network system 300, according to an embodiment. The system 300 includes a spine tier 302 and a leaf tier 304, where the leaf tier 304 includes one or more network elements (e.g., network elements 306A-N). Each of the network elements 306A-N of the leaf tier 304 can couple to a server group 310A-N, where each server group includes one or more servers. In one embodiment, each network element of the leaf tier 304 can be configured as a top of rack (ToR) switch, although other datacenter configurations for the network system 300 may be used (e.g., End of Row, etc.). Each of the network elements 306A-N of the leaf tier 304 can couple to a network element 303A-B in the spine tier 302. In one embodiment, each of the network elements 306A-N includes a state/status agent 308A-N to report configuration state and change in operational status of each of the network elements 306A-N. The state/status agents 308A-N can transmit the configuration state and status changes to one or more collector nodes (not shown) which may reside, for example, in the spine tier 302, in the leaf tier 304, as or a member of one or more of the server groups 310A-N. While the state/status agents 308A-N are shown with respect to the network elements 306A-N of the leaf tier 304, each network element (e.g., network element 303A-B) in the spine tier 302 can also include a state/status agent. In one embodiment, all network elements within the network system 300 includes separate state/status agent, which proactively transmits all state and status changes within the network element.

In one embodiment, the state/status changes are transmitted as in-band data along with production network data serviced by the network element. The state/status agents (e.g., 308A-N) within each network element can be configured to transmit state/status changes to one or more collector nodes. The address of the collector nodes can be pre-configured for the network element, or can be discovered via a discovery process in which the collector node broadcasts its presence to all state/status agents within the network system 300.

All of the aforementioned components may be co-located in the same physical location. Alternatively, the aforementioned components may not all be co-located. While each server group 310A-N is shown as connecting to a single network element in the leaf tier 304, one or more of the network elements 308A-N may support Multi-chassis Link Aggregation (MLAG), in which a given network element in the leaf tier 304 may be directly connected to one other network element. In such configuration, multiple servers within a single server group or multiple server groups may be connected to each of the network elements in the configured MLAG domain.

Each of the network elements 306A-N in the leaf tier 304, as well the network elements 303A-B of the spine tier 302, can include components illustrated with respect to the network element 100 of FIG. 1, including a control plane 104 having a CPU 108 to execute the illustrated state/status agents 308A-N of the network system 300 of FIG. 3. Each network element of the network system 300 can also include a network element software system (e.g., operating system) such as the network element software system 200 of FIG. 2, which can have components including but not limited to the various agents 202 illustrated in FIG. 2.

Figure 4:
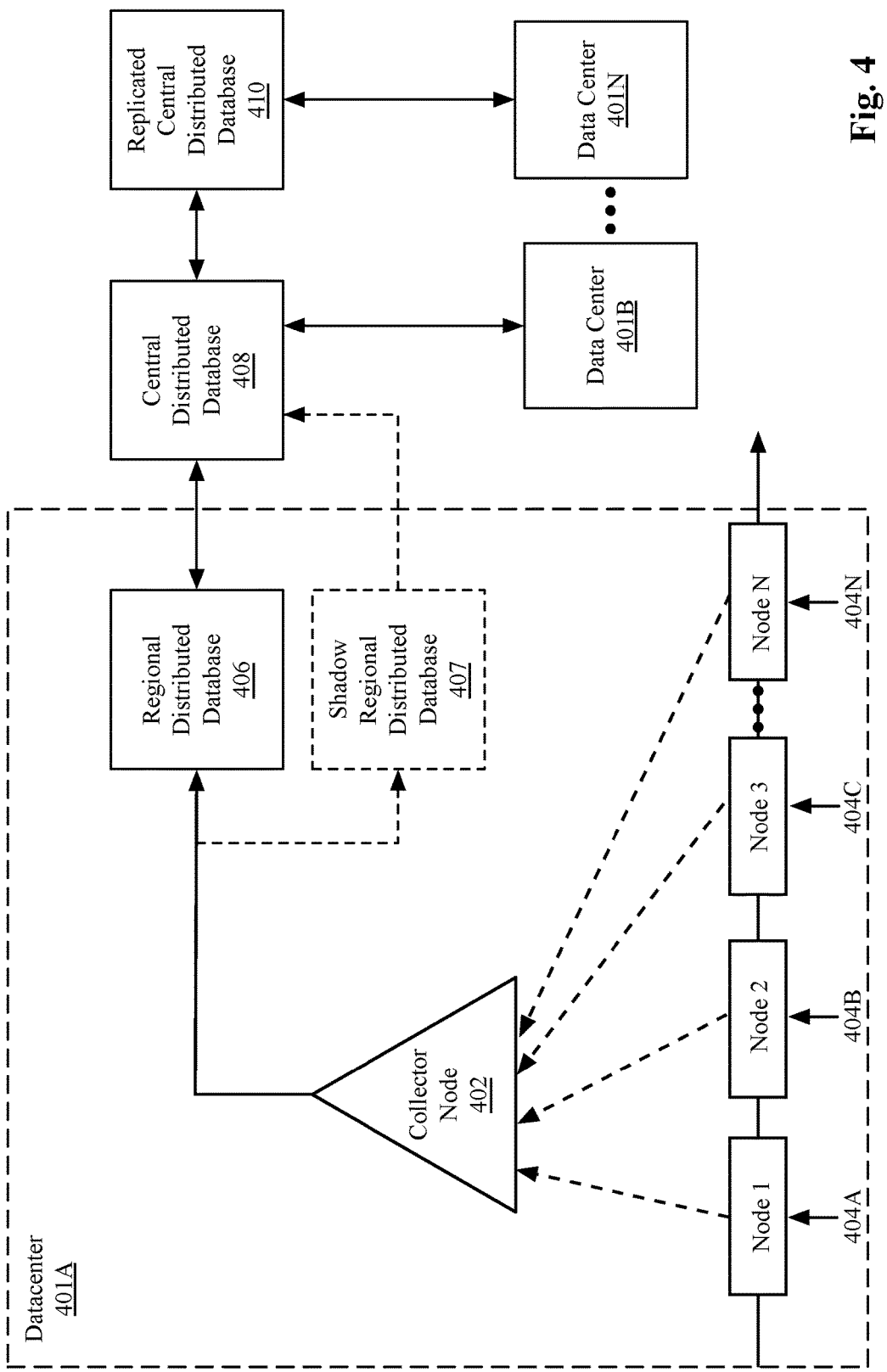
FIG. 4 illustrates elements of a system for state and status collection and replication, according to an embodiment.

FIG. 4 illustrates elements of a system for state and status collection and replication 400, according to an embodiment. As illustrated, a datacenter 401A is shown having multiple network element nodes 404A-N. In one embodiment, each node represents a network element having a state and status agent that can continuously transmit network information to a collector node 402. While a single collector node is shown, multiple collector nodes may be configured within the datacenter 401A. While in one embodiment the collector node 402 can send requests for specific state or status information, the state and status agent of each of the multiple network element nodes 404A-N are generally configured to transmit state and status updates as they occur.

In one embodiment, the collector node couples to a set of distributed databases, such as a regional distributed database 406 and one or more shadow regional distributed databases 407, which may each be co-located within the datacenter 401A along with the network element nodes 404A-N, although co-location is not required. The regional distributed database 406 and shadow distributed regional database 407 can be incrementally mirrored to a central distributed database 408 that contains state and status updates for other datacenters, such as datacenter 401B, which may be substantially similar to datacenter 401A.

In one embodiment, the central distributed database 408 can be replicated to a replicated central distributed database 410 for backup purposes, or as central interfaces for state and status updates for network element nodes of other datacenters (e.g., datacenter 401N). In such embodiment, two-way replication can be performed between the central distributed database 408 and the replicated central distributed database 410, such that each database 406-410 can ultimately receive state and status for each network element across the various datacenters 401A-N.

Figure 5:
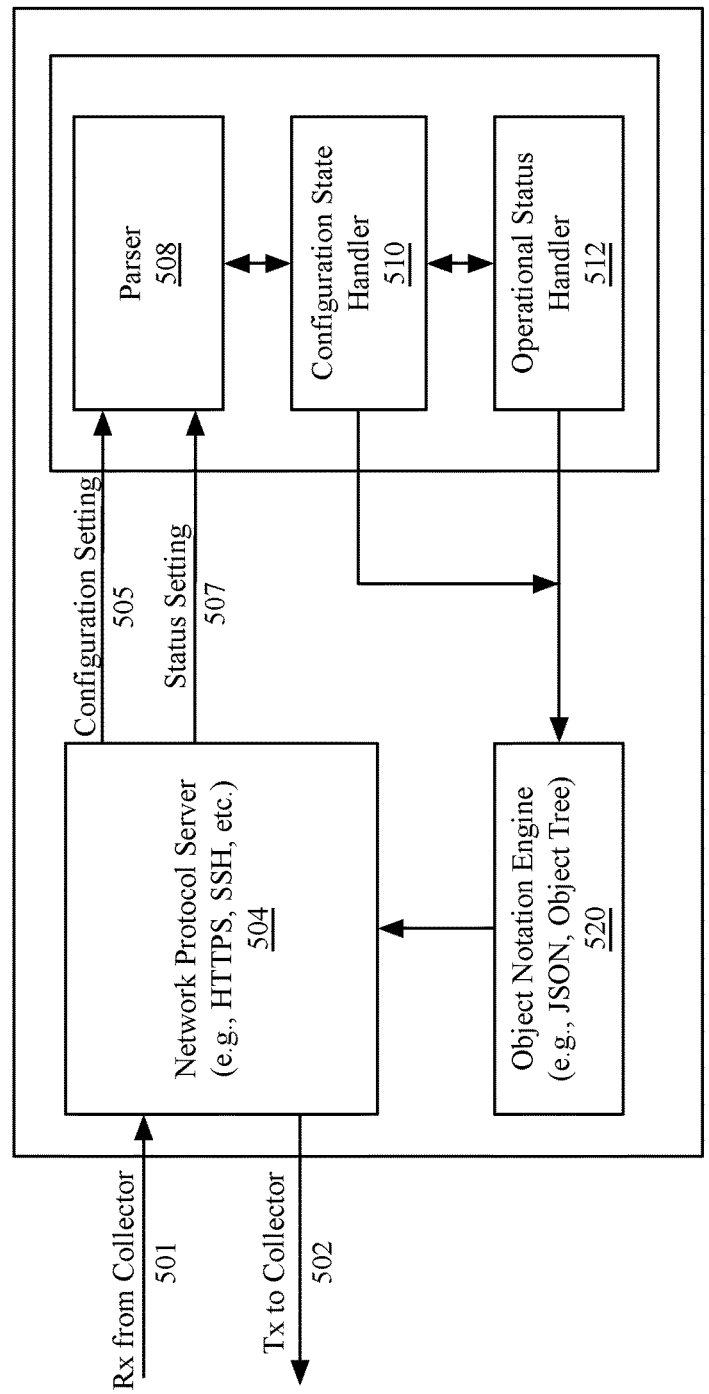
FIG. 5 illustrates elements of a network element state and status agent, according to an embodiment.

FIG. 5 illustrates elements of a network element state and status agent 500, according to an embodiment. The state and status agent 500 can be configured to receive 501 data from a collector (illustrated as Rx from collector) as well as transmit 502 data to a collector (illustrated as Tx to Collector). Transmitting to and receiving from the collector can be performed by a network protocol server 504 within the agent, such as an HTTPS server or an SSH server, although any network protocol server capable of receiving and transmitting network data may be used. In one embodiment, the Extensible Messaging and Presence Protocol (XMPP) may be used. The state and status agent 500 can additionally include a parser 508, a configuration state handler 510, and an operational status handler 512.

The network protocol server 504 can receive formatted configuration and state data from an object notation engine 520, which formats updates into an object notation, such as the JavaScript Object Notation (JSON), or some other form of object notation or object tree representation. The network protocol server 504 can also transmit incoming configuration settings 505 and status settings 507 to the parser 508, which can parse the incoming messages to determine whether an incoming message is intended to update the configuration state or the operational status of the network element. Where the incoming messages are received in an object notation format, the parser can include logic similar to the object notation engine 520. The parser 508 can supply configuration state updates to the configuration state handler 510 and operational status updates to the operational status handler 512.

Each of the configuration state handler 510 and the operational status handler 512 can receive or retrieve data from various data sources within the network element, such as, but not limited to a central system database (e.g., Sysdb), system logs, and agent logs, forwarding tables and other shared memory tables, and/or hardware specific state, such as hardware counters within network interfaces. In one embodiment, the configuration state handler 510 and operational status handler 512 can retrieve and report kernel and/or hardware abstraction layer data. The received or retrieved state and status data can be supplied to the object notation engine 520 for formatting before being transmitted to one or more collectors via the network protocol server 504.

In one embodiment, the network element state and status agent 500 is configured, upon startup, to query the state and status that is stored in the remote state and status database for the network element hosting the agent. In one embodiment the agent can determine a last known checkpoint for the host network element and request a report of changes since the determined checkpoint. In response, a collector node can transmit a diff between the current status and the checkpoint determined by the state and status agent 500. In one embodiment, the agent and collector can store data in a hierarchical fashion using a hash tree (e.g., Merkle tree) to enable accelerated synchronization of data between the object trees of the agent and the collector.

In one embodiment, instead of synchronizing data upon startup, the state and status agent can send a burst of all known configuration state and status information for the network element. In such embodiment, the collector node can detect and discard duplicate data received for a network element and merge any updated data into an object tree storing state and status data for the network element.

Figure 6:
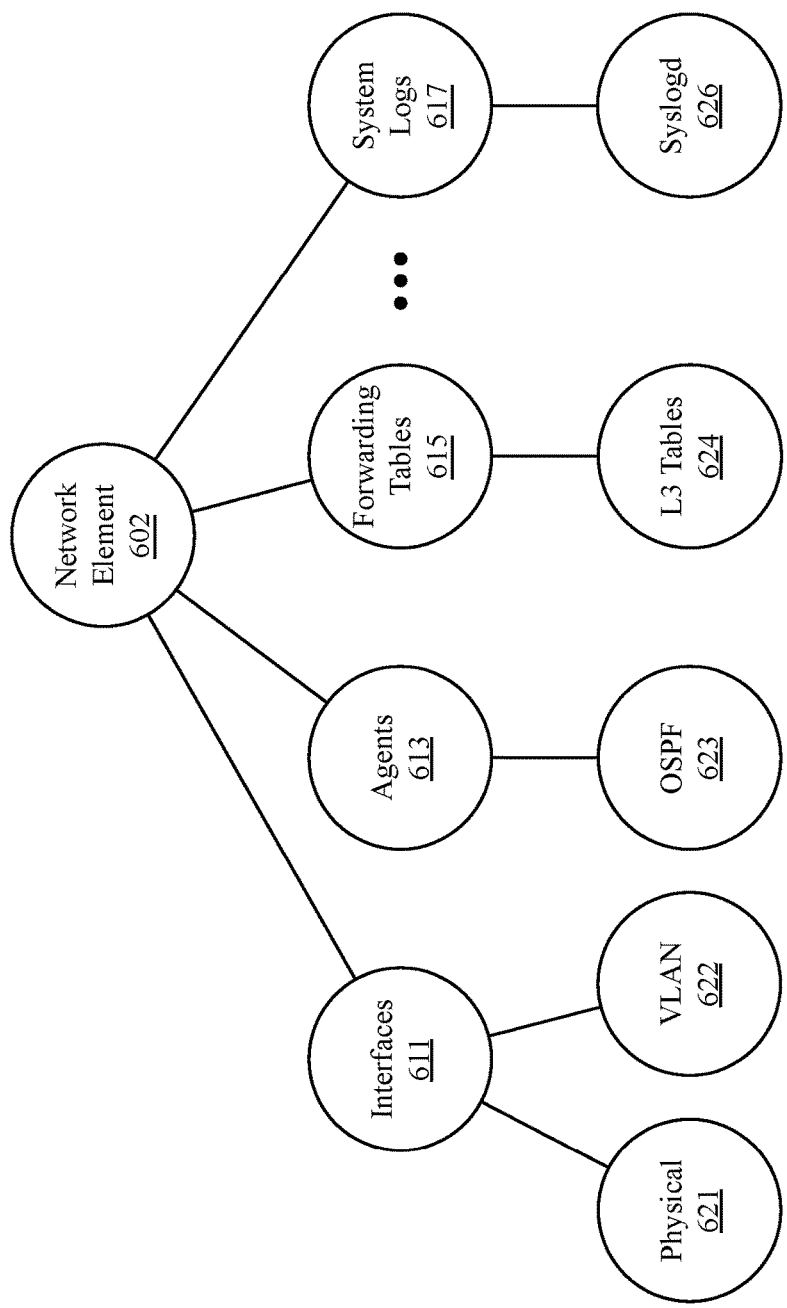
FIG. 6 is an illustration of exemplary hierarchy of state and status data transmitted to the collector.

FIG. 6 is an illustration of exemplary hierarchy 600 of state and status data transmitted to the collector. In one embodiment, the configuration state and operational status sent to a collector node by the state and status agent of a network element arranges updates in a hierarchical fashion. The illustrated hierarchy 600 is exemplary and embodiments are not limited to the precise hierarchy or data shown. In one embodiment a hierarchical object notation, such as hierarchical JSON, can be used to represent such updates. In one embodiment, the hierarchical representation is be used to accelerate synchronization between state and status agents of a network element and a collector node, or between collector nodes, for example by augmenting entries with hash values as in a Merkle tree. For example, using the Merkle tree, or another variant of a hash tree, branches or sub-branches of the tree can be downloaded or synchronized individually and the integrity of each branch or sub-branch can be checked immediately even when the entire tree is not yet available.

In the exemplary hierarchy shown, updates for a specific network element 602, which may be one of a large number of network elements for which data is gathered, is arranged in an object tree having branches including interfaces 611, agents 613, forwarding tables 615, and several other branches including a system logs 617 branch. The interfaces 611 branch can be further sub-divided into several sub-branches, including a physical interfaces 621 sub-branch and/or a virtual/VLAN interfaces 622 sub-branch. Additional sub-branches may include sub-branches for specific agents 613 (e.g., OSPF 232), specific forwarding tables 615 (e.g., L3/Routing tables 624), and system logs 617 (e.g., from a system log daemon such as syslogd 626).

Other types of data or hierarchies may be used in various embodiments. In one embodiment, all configuration state and operational status information can be transmitted and/or represented by a state and status agent of a network element. In one embodiment, the state and status agent can be configured to transmit the data in a generic fashion and the collector node may be configured to organize the data hierarchy from the data received. Table 1 below shows exemplary configuration and status data that may be transmitted by a state and status agent.

TABLE 1

Exemplary Configuration and Status data

<timestamp>:<network element ID>:configumtion:VLAN->allocation policy->ascending range->3000 3999
<timestamp>:<network element ID>:status:interfaces->physical->Et1->connected->full duplex->10Gb/s
<timestamp>:<network element ID>:status:interfaces->physical->Et2->Link down
<timestamp>:<network element ID>:configuration:interfaces->physical->Et2->disabled
<timestamp>:<network element ID>:status:interfaces->physical->Et3->connected->full duplex->10Gb/s The state and status information shown in Table 1 is exemplary and not representative of data transmitted in all embodiments, or the format of the data to be transmitted. Additional data may be represented, up to and including all configurable state and operational status information that is supported by the hardware and software of the network element. Exemplary data that may be transmitted is shown in a JSON format Table 2 below.

TABLE 2

Additional Exemplary Configuration and Status data

{"timestamp":1434754052405,"path":"/JPE12312302","updates":}"Smash":{"Pointer":"/JPE12312302/Smash"}}}
{"timestamp":1434754056371,"path":"/JPE12312302/stp/input/config/cli/backupIntfConfig","deletes":[ ]}
{"timestamp":1434754056194,"path":"/orphan/*noname_0x4f2b*","updates":{"pTypename":"}}
{"timestamp":1434754056194,"path":"/orphan/*noname_0x4f2b*","updates":{"flags":"}}
{"timestamp":1434754056194,"path":"/orphan/*noname_0x4f2b*","updates":{"status":0}}
{"timestamp":1434754056203,"path":"/orphan/*noname_0x4f4b*","updates":{"pTypename":"Tcpdump::Config"}}
{"timestamp":1434754056203,"path":"/orphan/*noname_0x4f4b*","updates":{"flags":"w"}}
{"timestamp":1434754056203,"path":"/orphan/*noname_0x4f4b*","updates":{"status":0}}

While JSON data is shown in Table 2, other data and/or object notation formats may be used to represent the exemplary state and status hierarchy 600 when transmitted updates for a network element. In one embodiment, a customized object notation format may be used.

Figure 7:
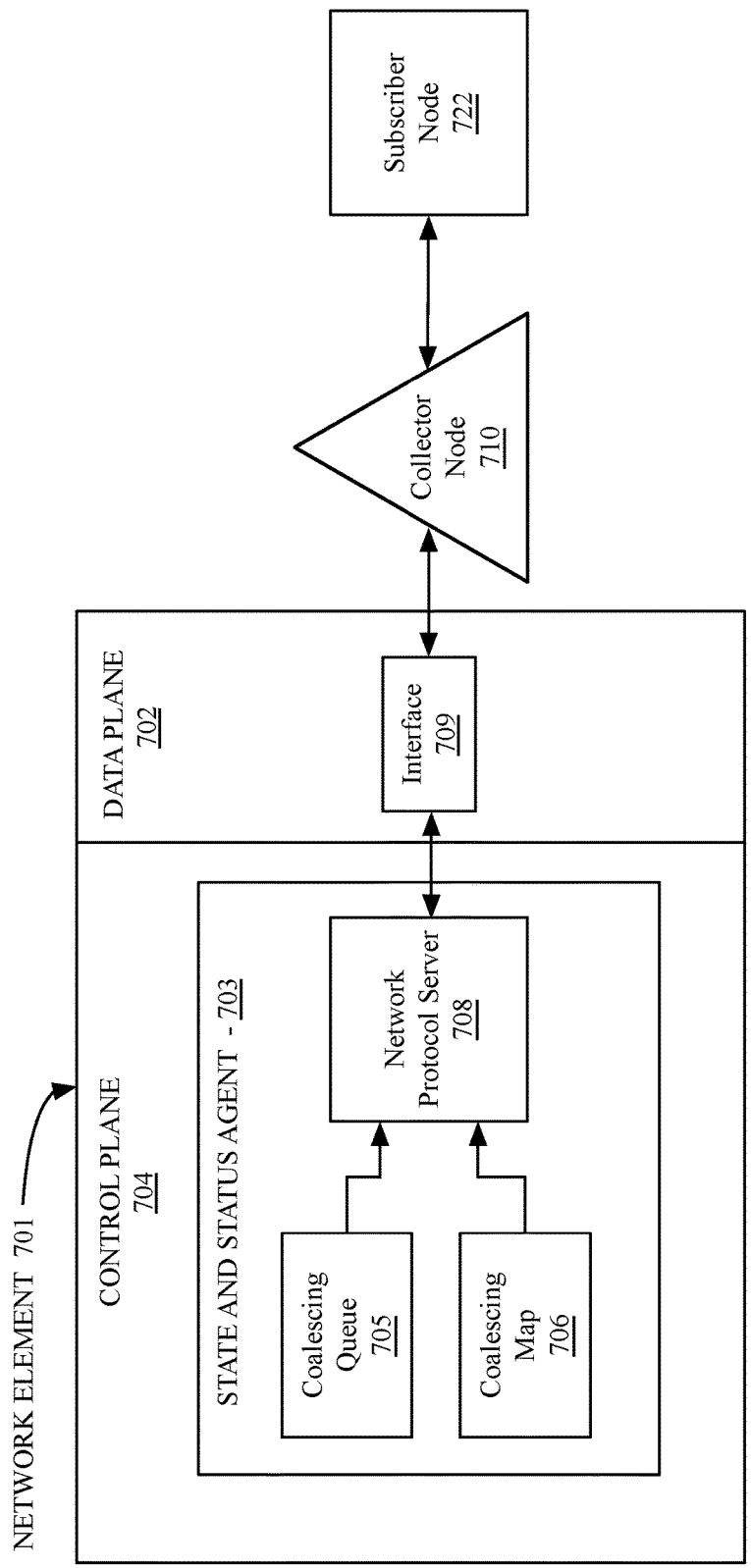
FIG. 7 is a block diagram illustrating state and status coalescing and subscription, according to an embodiment.

FIG. 7 is a block diagram illustrating state and status coalescing and subscription 700, according to an embodiment. In one embodiment, a network element 701 includes a control plane 704 having a state and status agent 703 and a data plane 702 having one or more network interfaces (e.g., interface 709). The state and status agent 703 can include a coalescing queue 705 and a coalescing map 706, which each store data pending transmission to a collector node 710 by a network protocol server 708 via the network interface 709. The network interface through which the state and/or status updates are transmitted is determined based on the address (e.g., network layer, data-link layer) of the collector node 710, as network data carrying state and/or status updates are forwarded in a similar manner as production network traffic.

Coalescing is enabled in some embodiments in the event that the state and/or status update rate exceeds the transmission rate. In such embodiments, the state and status agent 703 can insert all updates pending transmission into the coalescing queue 705. The network protocol server 708 can then transmit the updates via the network interface to which the collector node 710 is attached. As the network protocol server 708 drains updates for the coalescing queue 705, new updates may be continuously added for transmission. In the event the coalescing queue 705 fills, some or all of the pending updates can be stored in the coalescing map 706. In the coalescing map 706, older values will be overwritten with newer values. In one embodiment, the coalescing map 706 is agnostic to the specific pending updates, and all state and status updates are mapped equally. However, in some configurations, specific updates (e.g., configuration state changes) can be preserved while certain operational state data (e.g., interface hardware counter updates) can be discarded in favor of more recent data. In one embodiment, the coalescing map 706 is sized as a fixed ratio relative to the size of the coalescing queue 705. For example, the coalescing map 706 can be configured to store a significant multiple of the number of entries of the coalescing queue 705 in the vent the transmission rate is falling significantly behind, although the size of the coalescing map will not grow without limit. In one embodiment the network protocol server 708 is configured to transmit updates from both the coalescing queue 705 and the coalescing map 706.

In a further embodiment, a subscriber node 722 can subscribe to one or more network elements via the collector node 710 and receive configuration state and operational status of the one or more network elements via the distributed database to which the collector node 710 stores information. In one embodiment the subscriber node 722 is a network-connected device on the same network or a remotely accessible network to the network containing the network element 701 and collector node 710. In one embodiment, a data processing system can be configured as a subscriber node by software executing on the data processing system. In such embodiment, the subscriber node software can run on a variety of types of data processing systems, from mobile or handheld devices, workstations, and servers. In one embodiment, the subscriber node software can execute on a control plane CPU of a network element described herein.

The subscriber node 722 can request the collector node 710 to receive some or all state and status changes reported by the state and status agent 703 of the network element 701. In response the collector node 710 can stream state and status updates to the subscriber node 710 as the updates are received from the state and status agent 703 of the network element. If the subscriber node 722 specifies a subset of the total set of available information, the collector node 710 can report only that set of information. For example, the subscriber node can subscribe only to receive notice of control plane agent failures or interface status changes for the network element 701. In response, the collector node 710 can send only the subscribed information.

In one embodiment, the subscriber node 722 can reconstruct the configuration state and operational status of the network element 701 at a specific point in the past based on the subscribed state and status data. In one embodiment, the subscriber node 722 can transmit a configuration message to the network element 701 based on a received and stored configuration state and operational status of the network element 701. In one embodiment the subscriber node 722 can request the collector node to re-configure the network element 701 to the state and status of a particular time in the past. The re-configuration request can cause the network element 701 to adopt a subset of, or the entirety of the configuration and status of the network element 701 at the specified time in the past. In such embodiment, for example, to reproduce a failure condition on the network element 701, the subscriber node 722 can cause the network element 701 to reset to a specific state at a specific point in the past based on the state and status information stored in the distributed database by the collector node 710 for that particular point.

Figure 8A:
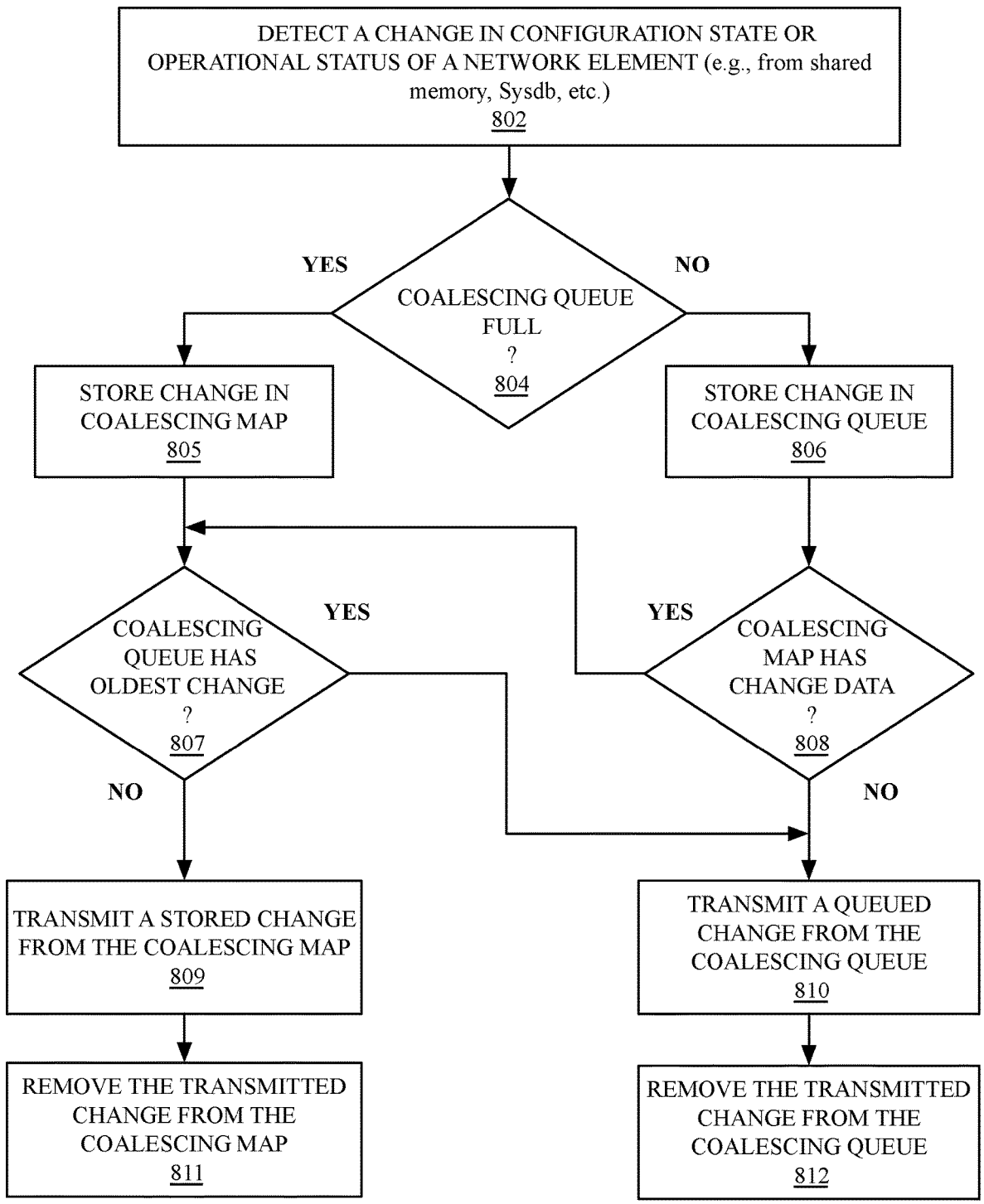
FIGS. 8A-B are flow diagrams of status update transmission and coalescing logic, according to an embodiment.
Figure 8B:
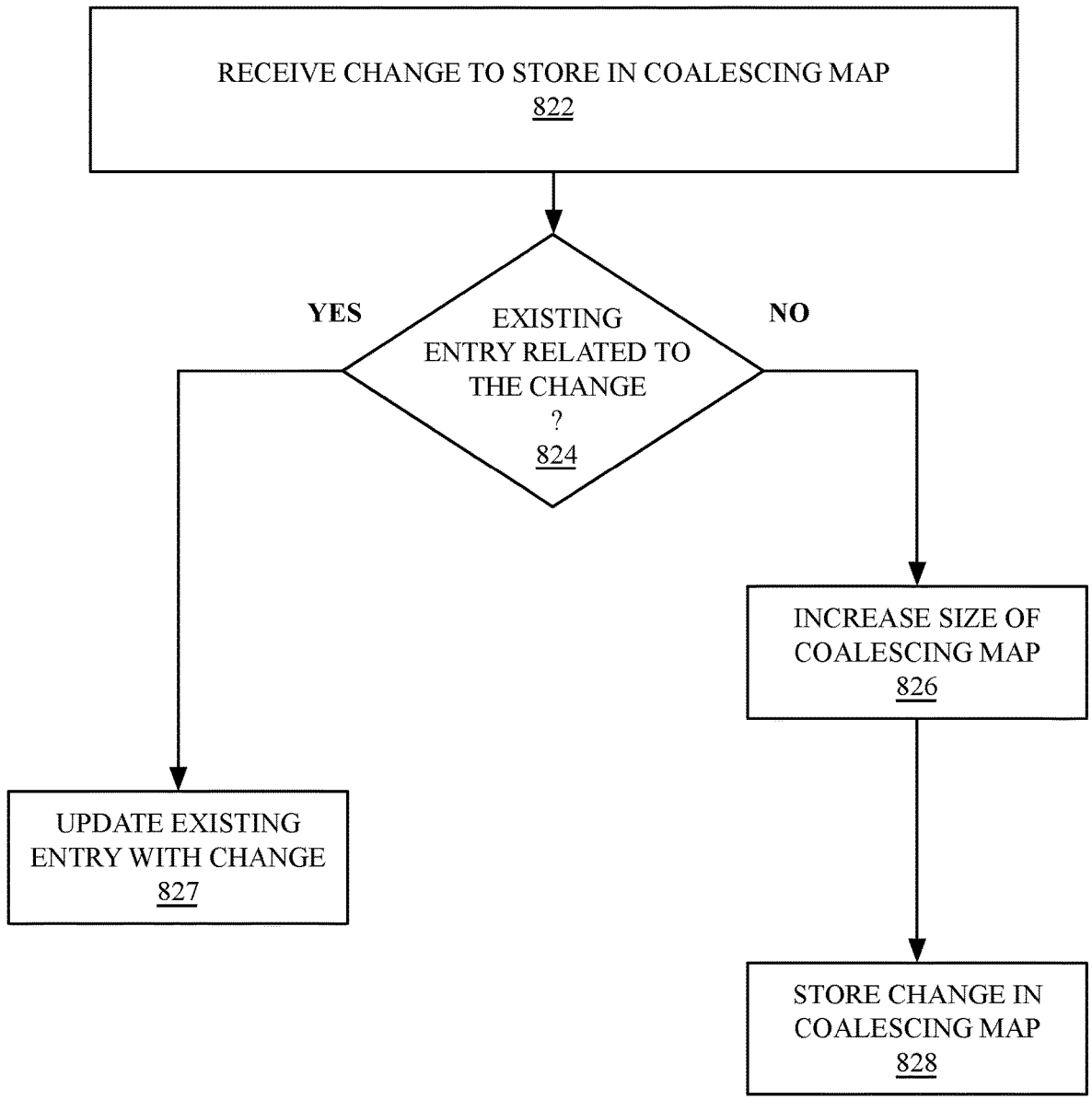

FIGS. 8A-B are a flow diagrams of status update transmission and coalescing logic 800, according to an embodiment. FIG. 8A illustrates the storing of updates pending transmission on a coalescing queue or map. FIG. 8B illustrates coalescing map operation when the coalescing queue is full. The status update transmission and coalescing logic 800 and coalescing map logic 820 may be performed by any of the state and status agents described herein (e.g., 308A-N, 500, 703, etc.).

As shown in FIG. 8A, an embodiment of the status update transmission and coalescing logic 800 performs operations to detect a change in configuration state or operational status of a network element, as shown at block 802. The change in state and/or status can be detected from several sources within the network element, including forwarding tables in shared memory of the network element (e.g., ARP, routing, etc.), a central system database (e.g., Sysdb), or other sources such as system logs and/or counters in network interface or network processing hardware. The changes in configuration state or operational status are generally transmitted via a network interface to the collector as often as possible, as limited by network conditions and/or QoS policy. In the event the update rate exceeds the change transmission rate for a period of time, the coalescing queue may become full. Before storing a newly detected change in configuration state, the status update transmission and coalescing logic 800 can determine whether the coalescing queue is full, as shown at block 804. If the coalescing queue is full, the change may be stored in the coalescing map, as shown at block 805. If the coalescing queue is not full, the change may be stored in the coalescing queue 806.

After storing the change in the coalescing queue at block 806, the status update transmission and coalescing logic 800 can perform a check to determine whether the coalescing map has any stored change data, as shown at block 808. In one embodiment, it may be assumed that the coalescing map has change data after a change is stored in the coalescing map at block 805.

In one embodiment, the oldest stored change will be transmitted from one of the coalescing map or coalescing queue. If the coalescing map has stored change data, the logic can determine whether the coalescing queue has the oldest change stored in the coalescing queue or the whether the coalescing map has the oldest change data, as shown at block 807. If the coalescing queue does not have the oldest change as determined at block 807, the status update transmission and coalescing logic 800, at block 809, can transmit a stored change from the coalescing map. The logic can then remove the transmitted change from the coalescing map, as shown at block 811.

If the coalescing queue has the oldest change as determined at block 807, the status update transmission and coalescing logic 800, at block 810, can transmit a queued change from the coalescing queue. The logic can then remove the transmitted change from the coalescing queue, as shown at block 812. In one embodiment, changes from each of the coalescing map and coalescing queue may be consolidated into a single transmission. In one embodiment, multiple changes from either of the coalescing queue or coalescing map may be consolidated into a single transmission.

FIG. 8B shows a flow diagram of coalescing map logic 820, according to an embodiment. In one embodiment the coalescing map logic 820, in response to the receipt of a change to store in the coalescing map shown at block 822, can determine whether an existing exists in the coalescing map that is related to the incoming change, as shown at block 824. If the coalescing map contains an existing entry related to the received change, the coalescing map logic 820 can update the existing entry with the change. A related entry can be an existing entry for the same data or for data that is within the same group of data. Such related entries include, but are not limited to successive update to a counter, successive updates to a related group of counters, or successive status changes from the same device, or other changes that can be coalesced into a single entry. In various embodiments, specifics of the update at block 827 can vary. In one embodiment the update can include appending the received change to the existing entry. In one embodiment, where multiple changes are stored within a coalescing map entry, an existing entry may be overwritten if the loss of data will not be significant.

If no existing entry in the coalescing map is determined to be related to the received change, the coalescing map logic 820 can determine whether the coalescing map can increase the size of the coalescing map at block 826 and store the received change in the coalescing map at block 828. In one embodiment, the coalescing map may be allowed to grow significantly larger than the coalescing queue if the update rate exceeds the transmission rate for a significant period of time. However, the coalescing map may have a maximum size, at which the coalescing map will no longer be allowed to grow. In one embodiment, once the maximum size is reached the coalescing map logic 820 may begin to overwrite older entries or drop (e.g., not store) certain updates. However, if the coalescing map contains the oldest pending changes, those changes will be first to be transmitted, as shown in FIG. 8A.

Exemplary Data Processing System and Modular Network Element

Figure 9:
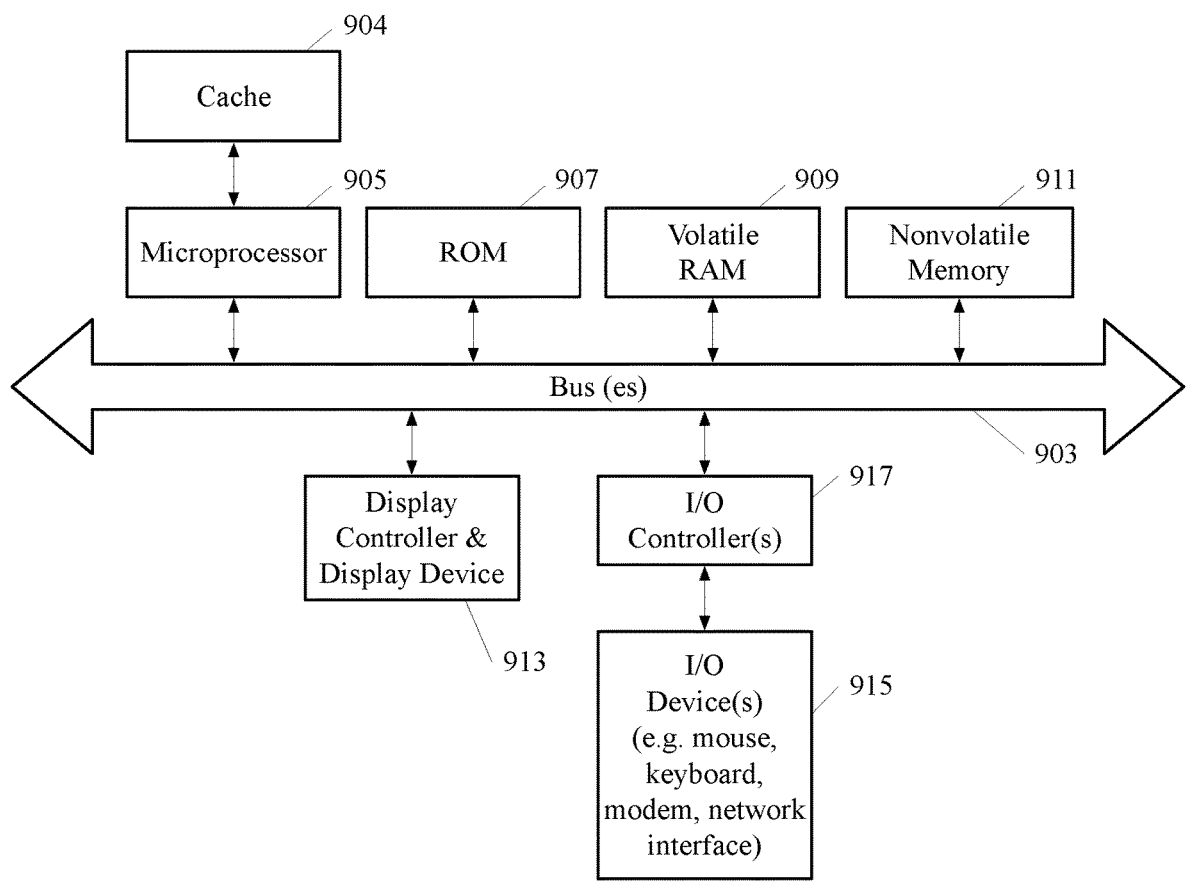
FIG. 9 shows one example of a data processing system, which may be used in accordance with an embodiment.

FIG. 9 shows one example of a data processing system 900, which may be used with one embodiment of the present invention. For example, the data processing system 900 may be implemented including one or more of network element 100 as in FIG. 1, or any other network element described herein. In one embodiment, the data processing system 900 is used within the control plane of a network element described herein. Note that while FIG. 9 illustrates various components of a computer system, it is not intended to represent any particular architecture or manner of interconnecting the components as such details are not germane to the present invention. It will also be appreciated that network computers and other data processing systems or other consumer electronic devices, which have fewer components or perhaps more components, may also be used with the present invention.

The data processing system 900 includes one or more bus(es) 903 which couple to one or more microprocessor(s) 905, ROM (Read Only Memory) 907, volatile RAM 909 and a non-volatile memory 911. In one embodiment, the one or more microprocessor(s) 905 couple to a cache 904, which can include one or more sets of instruction and/or data caches. The bus(es) 903 may include one or more buses connected to each other through various bridges, controllers and/or adapters as is well known in the art.

The microprocessor(s) 905 may retrieve the instructions from the memories 907, 909, 911 and execute the instructions to perform operations described above. Instructions and/or associated data retrieved from the memories 907, 909, 911 may be stored in the cache 904. The bus(es) 903 interconnect system components with each other, and to a display controller and display device 913, and to peripheral devices such as input/output (I/O) devices, which may be mice, keyboards, modems, network interfaces, printers and other devices well known in the art. Typically, the input/output devices 915 are coupled to the system via input/output controller(s) 917. The volatile RAM (Random Access Memory) 909 is typically implemented as dynamic RAM (DRAM), which requires power continually in order to refresh or maintain the data in the memory, but may also include static ram (SRAM), which does not require a periodic refresh.

In one embodiment, the non-volatile memory 911 is used at least in part as mass storage, which typically includes one or more of a magnetic hard drive, a magnetic optical drive, an optical drive, flash memory, or other types of memory systems, which maintain data after power is removed from the system. Typically, the mass storage portion of the non-volatile memory 911 will also be a random access memory although this is not required. While FIG. 9 shows that the non-volatile memory 911 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "process virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine-readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

Figure 10:
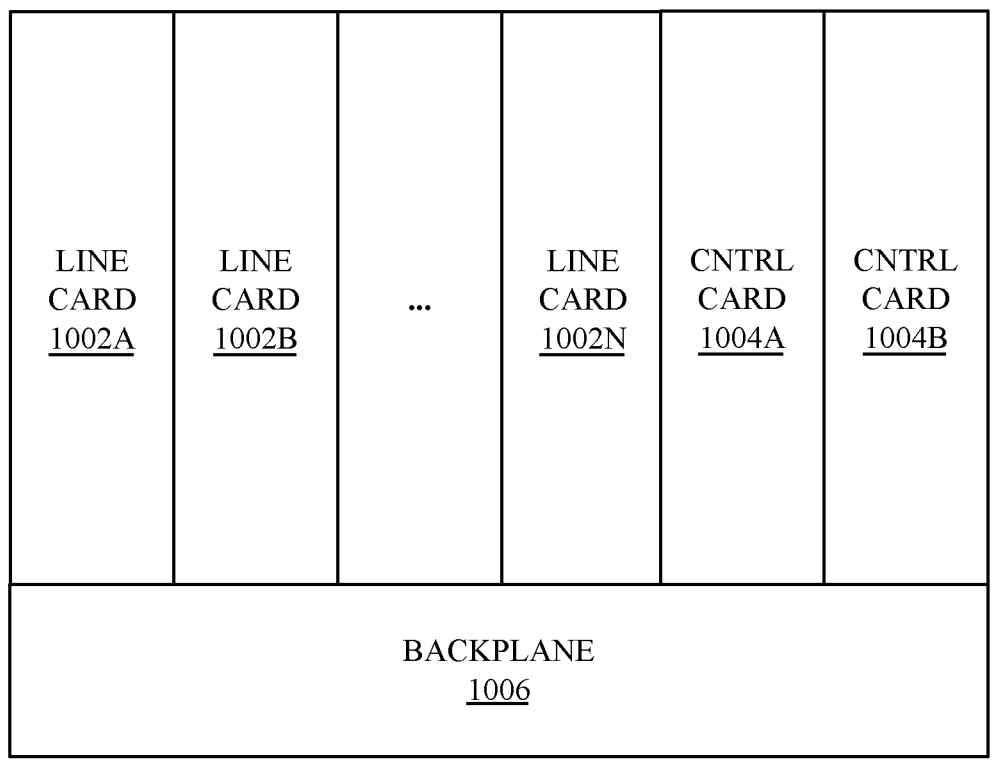
FIG. 10 is a block diagram of an additional embodiment of an exemplary modular network element as described herein.

FIG. 10 is a block diagram of an additional embodiment of an exemplary modular network element 1000 as described herein. In one embodiment, the network element has a modular and expandable configuration that allows the addition or removal of resources configured as line cards 1002A-N, or controller cards 1004A-B coupled to a backplane 1006. In one embodiment, the controller cards 1004A-B control the processing of the traffic by the line cards 1002A-N, which can each include one or more network data forwarding devices such as interfaces 106A-C as in FIG. 1, although the precise nature of the forwarding devices is not limited as such. In one embodiment, the line cards 1002A-N process and forward traffic according to the network policies received from controller cards the 1004A-B. In one embodiment, one or more of the line cards 1002A-N can monitor and report internal performance data, such as latency data for all or selected units of network data traversing the network element. In one embodiment, the controller cards 1004A-B can also be configured to perform all or a sub-set of functions provided by the line cards 1002A-N. It should be understood that the architecture of the network element 1000 illustrated in FIG. 10 is exemplary, and different combinations of cards may be used in other embodiments.

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "measuring," "receiving," "determining," "transmitting," "sending," "forwarding," "detecting," "gathering," "dropping," "communicating," "canceling," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description above. In addition, software aspects of the various embodiments are not described with reference to any particular programming language. It will be appreciated that a variety of programming languages may be used to implement the teachings described herein.

In the description above and in the claims below, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. Additionally, the terms "server," "client," and "device" are intended to refer generally to data processing systems rather than specifically to a particular form factor for the server, client, and/or device.

Specifics in the descriptions and examples provided may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to performs acts of the method, or of an apparatus or system for according to embodiments and examples described herein. Additionally various components described herein can be a means for performing the operations or functions described in accordance with an embodiment.

One embodiment provides for a network element comprising a control plane including logic to continuously transmit runtime configuration and status of the network element during network element operation, the configuration including a configured state of one or more agents of the control plane and the status including operational status of one or more agents of the control plane; and a data plane to forward network data from an ingress interface to an egress interface, each of the ingress interface and egress interface including one or more counters, wherein the status of the network element additionally includes the one or more counters of each of the ingress interface and egress interface.

In a further embodiment the one or more agents of the control plane include a data-link layer forwarding agent. The one or more agents of the control plane can also include a network layer forwarding agent. The configuration of the network element can include a configured data rate of an interface and whether the interface is configured as enabled. The status of the network element can indicate whether a current state of an interface differs from the configured state of the interface. In one embodiment, the logic of the control plane is configured to continuously transmit configuration and status of the network element to a collector node coupled with the network element via a network interface. The control plane logic can continuously transmit runtime updates that are made to one or more tables in shared memory of the control plane. The one or more tables can include a network layer forwarding table and/or a data-link layer forwarding table. The one or more data-link layer forwarding tables in shared memory of the control plane can include an address resolution protocol (ARP) table.

In one embodiment the control plane logic to continuously transmit status is configured to transmit runtime updates one or more network element logs. In one embodiment, the logic is configured to continuously transmit configuration and status of the network element by coalescing status updates pending transmission when a rate of status and configuration updates exceeds a transmission rate of the updates. In one embodiment, the control plane includes additional logic to receive configuration and status data for the network element and configure the network element based on the configuration and status data, the received configuration and status data derived from transmitted runtime configuration and status data.

One embodiment provides for a networked system comprising multiple network elements, each network element configured to transmit runtime configuration and status data over a network, the configuration including a configured state of one or more agents of a control plane of the network element and the status including operational status of one or more agents of the control plane of the network element; a collector node to receive the configuration and status data of each of the multiple network elements and store the data in a first distributed database; and a subscriber node to subscribe to one or more of the multiple network elements, the subscriber node to receive the configuration and status of the one or more of the multiple network elements via the first distributed database, reconstruct the configuration and status of the one or more of the multiple network elements at a specific point in time and transmit a configuration message to the one of more of the multiple network elements, the configuration message to cause the one or more of the multiple network elements to adopt the configuration and status of the specific point in time.

In one embodiment, the configuration includes a configured data rate of an interface of a network element and whether the interface is configured as enabled. In one embodiment, the status indicates whether a current state of an interface differs from the configured state of the interface. One or more agents of the control plane can include a data-link layer forwarding agent and a network layer forwarding agent.

In one embodiment, the networked system additionally comprises a replicator, to replicate the first distributed database to a second distributed database. The first distributed database can be a regional database and the second distributed database can be a central distributed database. Each network element can include a state and status agent to continuously transmit configuration and status data over the network, the state and status agent to coalesce data transmissions when a rate of state and status updates exceeds a transmission rate of state and status updates.

One embodiment provides for a non-transitory machine readable medium storing instructions which, when executed by one or more processors of a control plane of a network element, cause the one or more processors to perform operations including detecting a change in one or more of operational status and configuration state of the network element; storing the change in a coalescing queue; transmitting a change in the coalescing queue via a network interface of the network element to a collector node; and removing the change from the coalescing queue. In one embodiment, the operations additionally include storing the change in a coalescing map when the coalescing queue is full, transmitting a change from one or more of the coalescing queue and the coalescing map, and updating an existing entry in the coalescing map upon receiving an additional change in operational state when the existing entry is related additional change.

While the foregoing discussion describes exemplary embodiments of the present invention, one skilled in the art will recognize from such discussion, the accompanying drawings, and the claims, that various modifications can be made without departing from the spirit and scope of the invention. Therefore, the illustrations and examples herein should be construed in an illustrative, and not a restrictive sense. The scope and spirit of the invention should be measured solely by reference to the claims that follow.

What is claimed is:

1. A network element, comprising:
a control plane including a first agent, the first agent configured to transmit updates on state and status of the network element to one or more collector nodes during network element operation; and
a data plane to forward network data from an ingress interface to an egress interface.

2. The network element of claim 1, wherein the control plane further comprises:
a plurality of agents recording agent specific state and status information corresponding to the state and status of the network element; and
a system database for storing the state and status information received from the plurality of agents;
wherein the system database communicates the state and status of the network element to the first agent.

3. The network element of claim 2, wherein when a particular state and status of a particular agent of the plurality of agents changes, the particular agent updates the system database, and wherein the system database updates the first agent.

4. The network element of claim 2, wherein the plurality of agents are configured to implement one or more of Spanning Tree protocol (STP), Open Shortest Path First (OSPF), Border Gateway Protocol (BGP), Virtual eXtensible LAN (VxLAN), or Multi-Chassis Link Aggregation (MLAG).

5. The network element of claim 1, wherein the first agent comprises:
 a state handler for retrieving the state and status from the system database;
 an object notation engine for formatting the updates on the state and status; and
 a network protocol server for communicating the updates to the one or more collector nodes.

6. The network element of claim 1, wherein the first agent is further configured to transmit the updates via the data plane.

7. The network element of claim 1, wherein the first agent is further configured to transmit the updates continuously.

8. The network element of claim 1, wherein the first agent is further configured to query a remote state database for a historical state and to restore the network element to the historical state.

9. The network element of claim 1, wherein the one or more collector nodes are configured to aggregate and archive state and status associated with the network element and one or more additional network elements.

10. A method, comprising:
 transmitting, by a first agent of a control plane of a network element to one or more collector nodes, updates on state and status of the network element during network element operation; and
 forwarding, by a data plane of the network element, network data from an ingress interface to an egress interface.

11. The method of claim 10, further comprising:
 recording, by a plurality of agents, agent specific state and status information corresponding to the state and status of the network element; and
 storing, by a system database of the control plane, the state and status information received from the plurality of agents;
 wherein the system database communicates the state and status of the network element to the first agent.

12. The method of claim 11, wherein the plurality of agents are configured to implement one or more of Spanning Tree protocol (STP), Open Shortest Path First (OSPF), Border Gateway Protocol (BGP), Virtual eXtensible LAN (VxLAN), or Multi-Chassis Link Aggregation (MLAG).

13. The method of claim 10, further comprising:
 retrieving, by a state handler of the first agent, the state and status from the system database;
 formatting, by an object notation engine of the first agent, the updates on the state and status; and
 communicating, by a network protocol server of the first agent, the updates to the one or more collector nodes.

14. The method of claim 10, wherein said transmitting occurs via the data plane.

15. The method of claim 10, wherein the one or more collector nodes are configured to aggregate and archive state and status associated with the network element and one or more additional network elements.

16. A non-transitory machine-readable medium storing a computer program executable by at least one processing unit of a device, the program comprising instructions for:
 transmitting, by a first agent of a control plane of a network element to one or more collector nodes, updates on state and status of the network element during network element operation; and
 forwarding, by a data plane of the network element, network data from an ingress interface to an egress interface.

17. The non-transitory machine-readable medium of claim 16, further comprising instructions for:
 recording, by a plurality of agents, agent specific state and status information corresponding to the state and status of the network element; and
 storing, by a system database of the control plane, the state and status information received from the plurality of agents;
 wherein the system database communicates the state and status of the network element to the first agent.

18. The non-transitory machine-readable medium of claim 17, wherein the plurality of agents are configured to implement one or more of Spanning Tree protocol (STP), Open Shortest Path First (OSPF), Border Gateway Protocol (BGP), Virtual eXtensible LAN (VxLAN), or Multi-Chassis Link Aggregation (MLAG).

19. The non-transitory machine-readable medium of claim 16, further comprising instructions for:
 retrieving, by a state handler of the first agent, the state and status from the system database;
 formatting, by an object notation engine of the first agent, the updates on the state and status; and
 communicating, by a network protocol server of the first agent, the updates to the one or more collector nodes.

20. The non-transitory machine-readable medium of claim 16, wherein the first agent is further configured to query a remote state database for a historical state and to restore the network element to the historical state.

* * * * *